April 11, 1961 J. VANI ET AL 2,978,718
VEHICLE WHEEL WASHING DEVICE
Filed Aug. 27, 1957 8 Sheets-Sheet 2
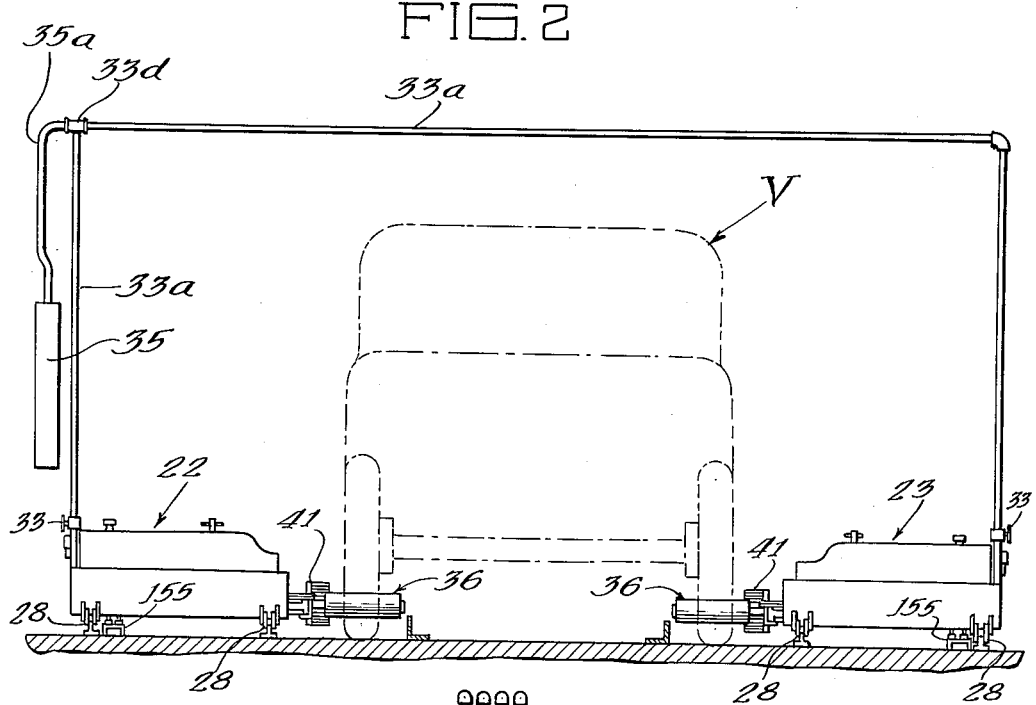
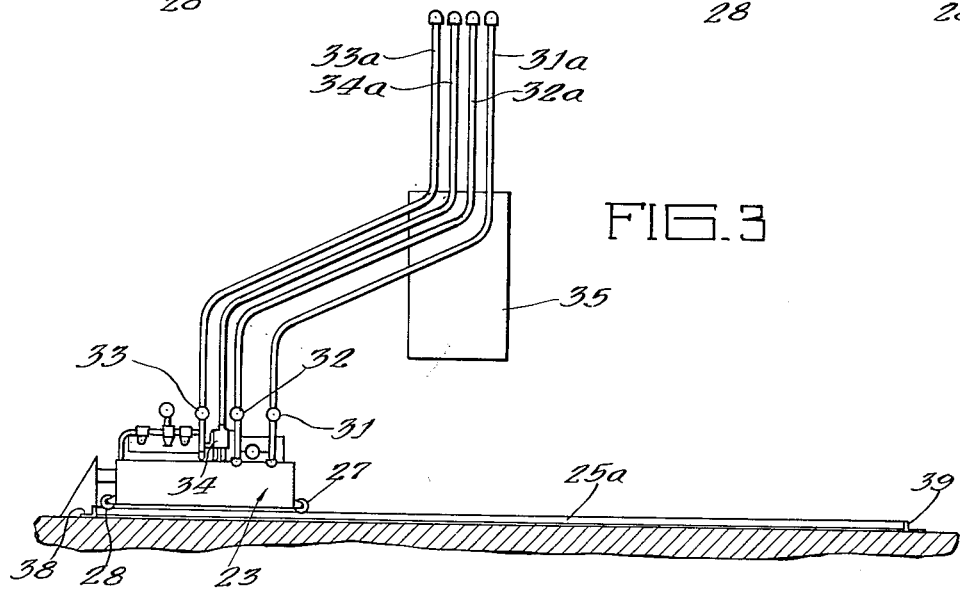
Inventors:
James Vani
Albert J. Malpede
By: Wallace and Cannon
Attorneys April 11, 1961 J. VANI ET AL 2,978,718
VEHICLE WHEEL WASHING DEVICE
Filed Aug. 27, 1957 8 Sheets-Sheet 3
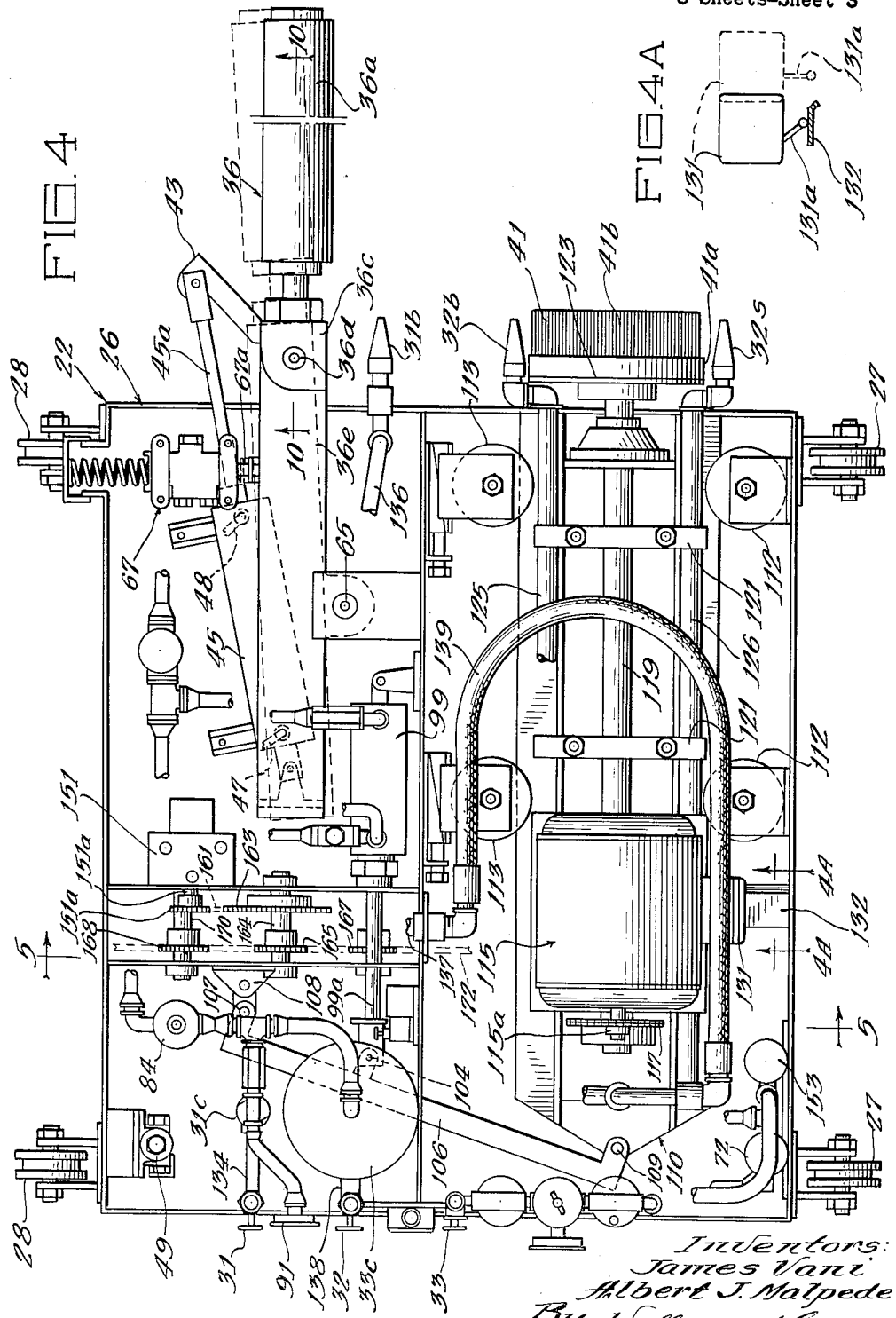
Inventors:
James Vani
Albert J. Malpede
By Wallace and Cannon
Attorneys April 11, 1961  J. VANI ET AL  2,978,718
VEHICLE WHEEL WASHING DEVICE
Filed Aug. 27, 1957  8 Sheets-Sheet 4
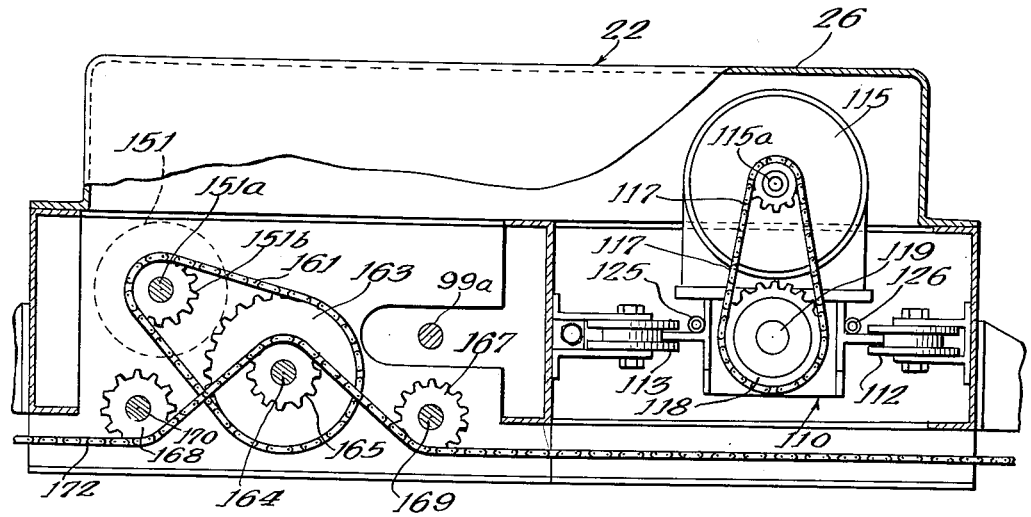
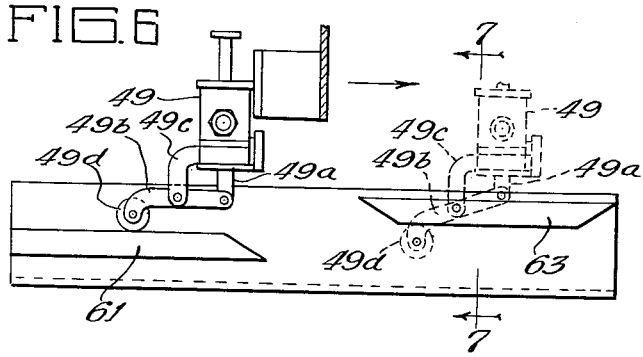
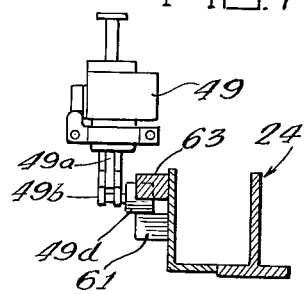
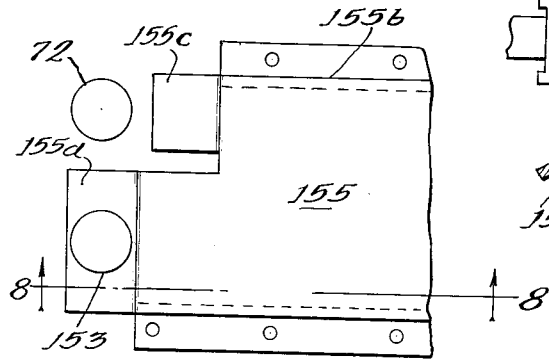
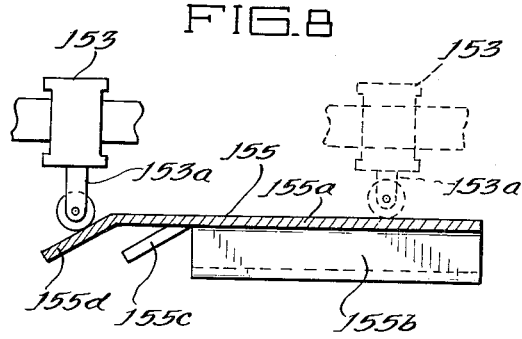
Inventors
James Vani
Albert J. Malpede
By: Wallace and Cannon
Attorneys

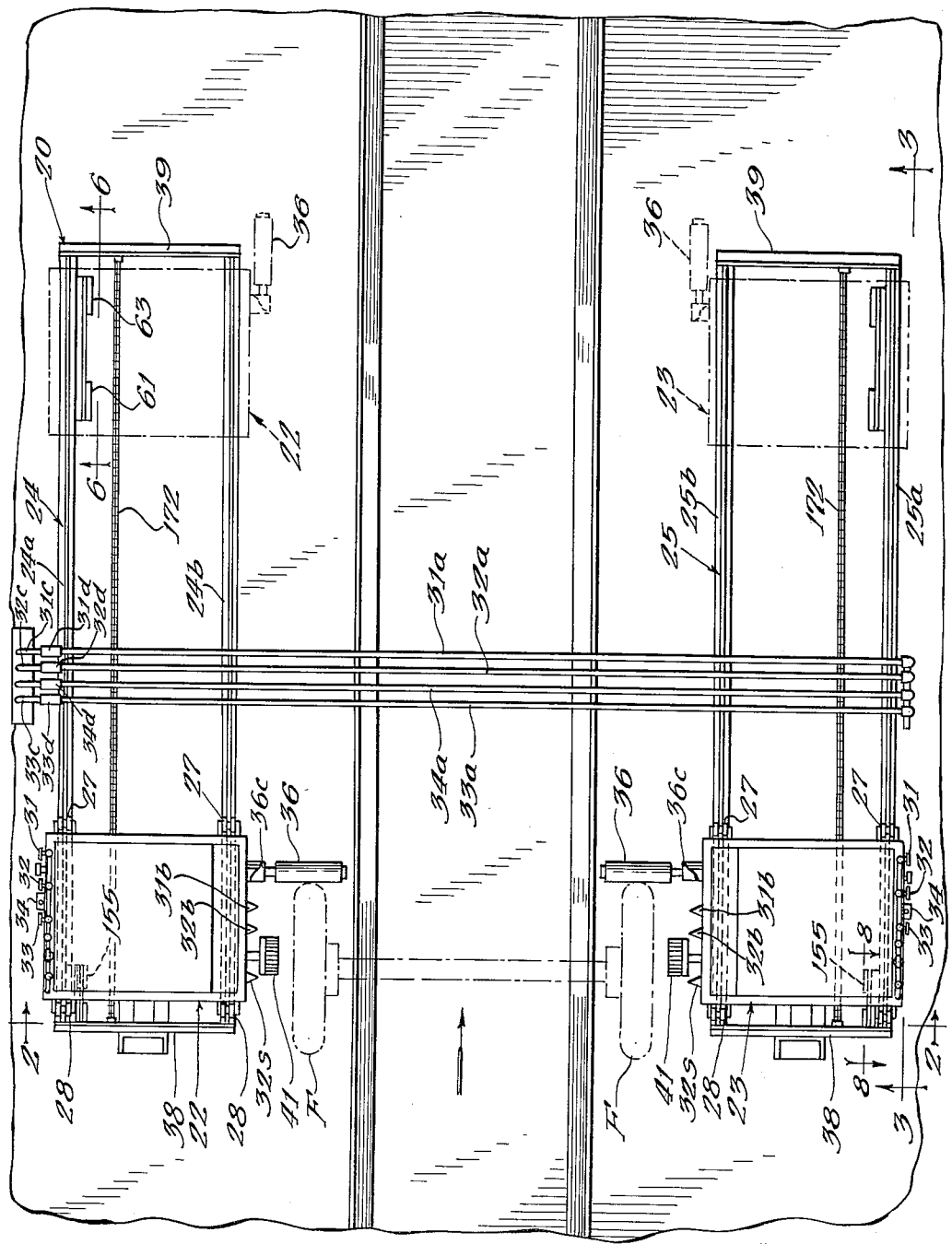

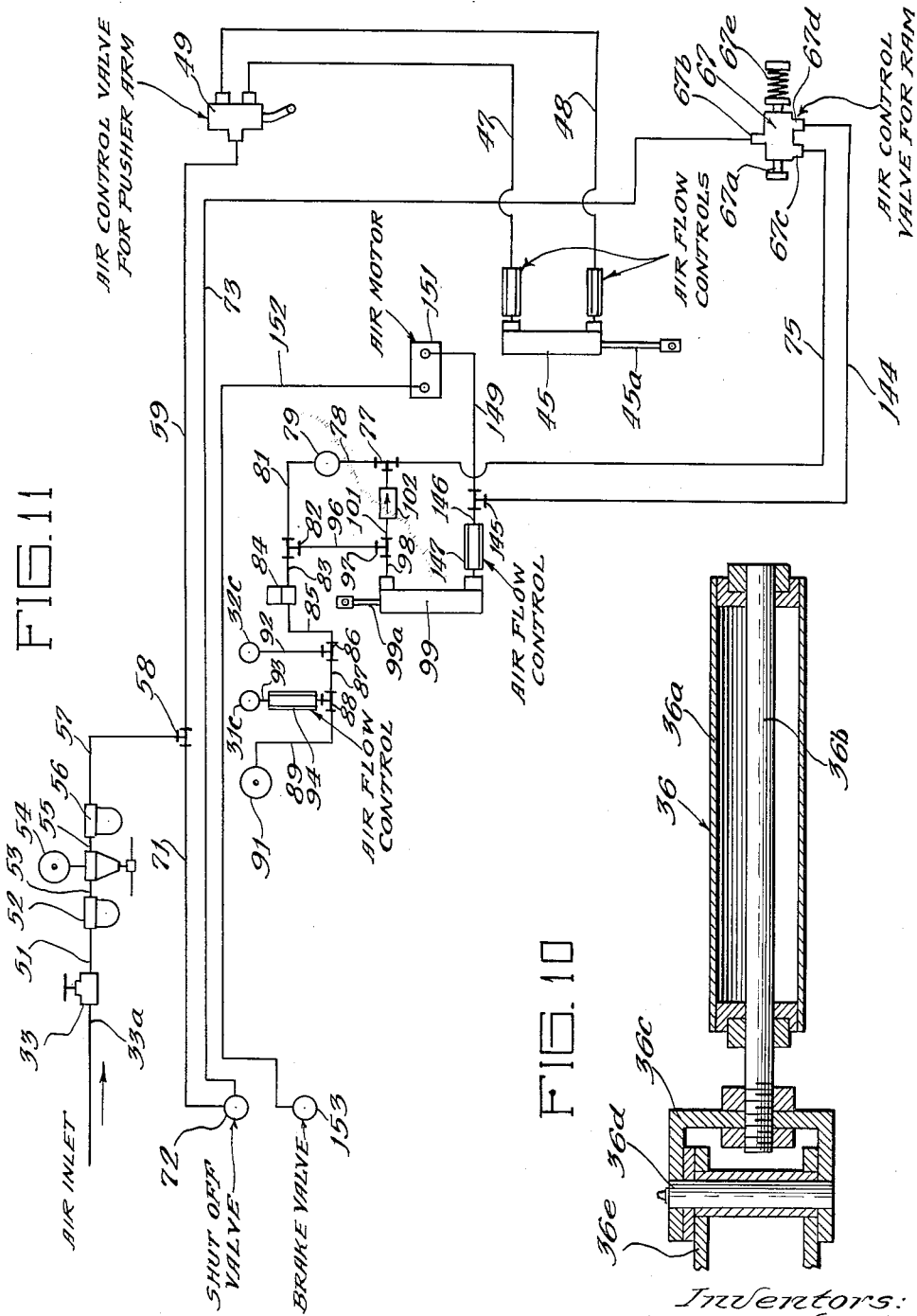

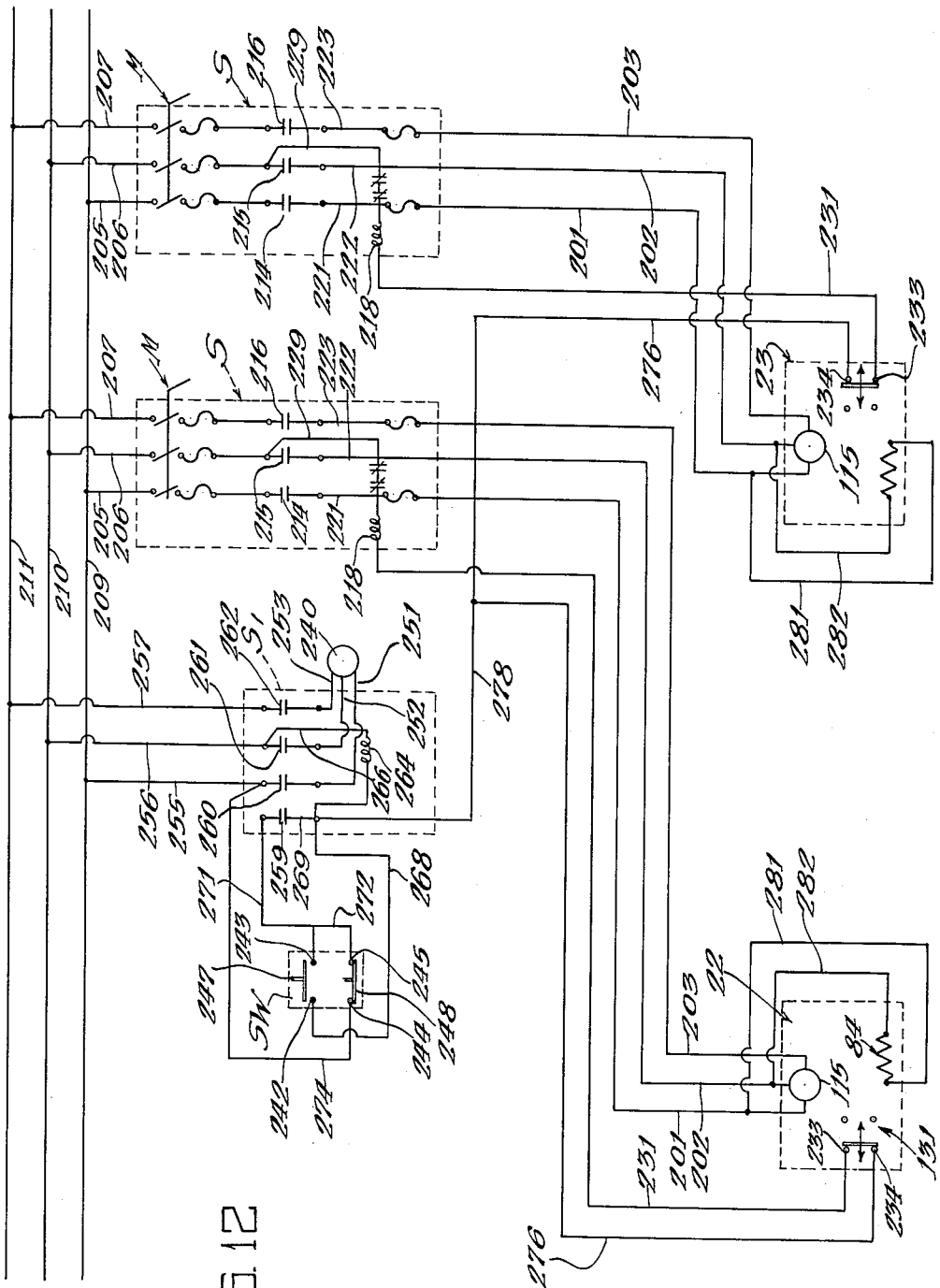

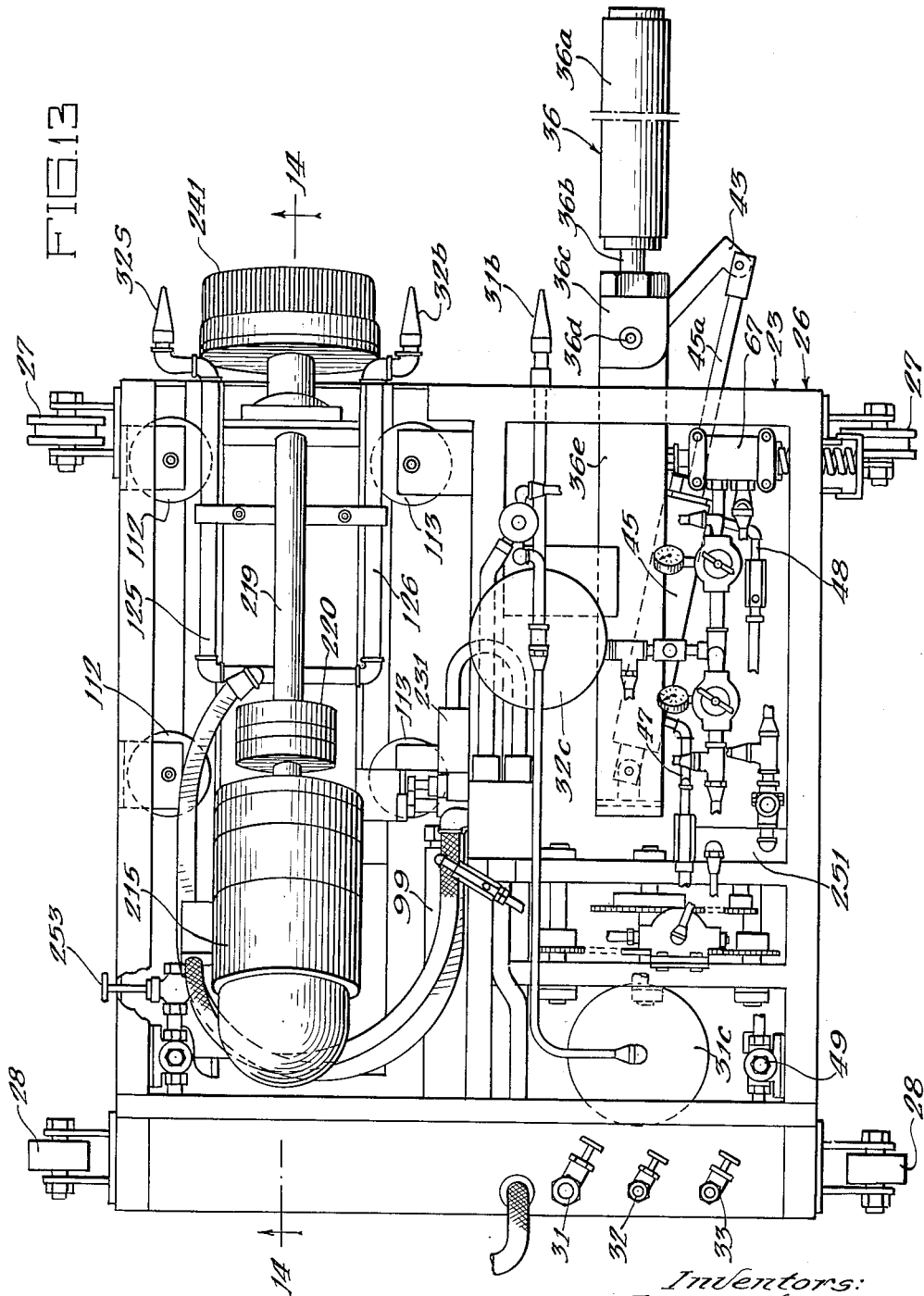

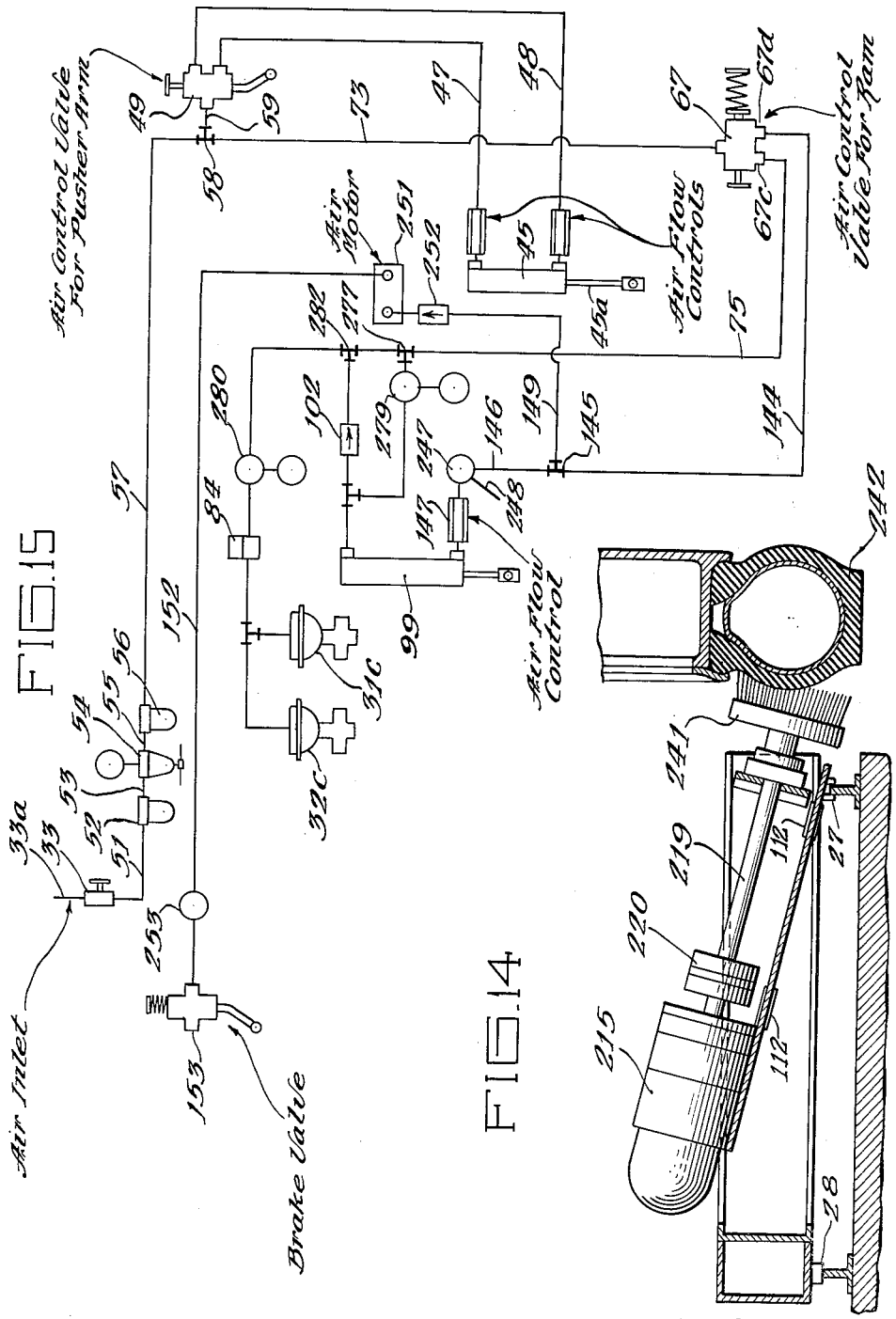

United States Patent Office 2,978,718
Patented Apr. 11, 1961

2,978,718

VEHICLE WHEEL WASHING DEVICE

James Vani, Midlothian, and Albert J. Malpede, Chicago, Ill., assignors to Service Metal Fabricators, Inc., a corporation of Illinois Filed Aug. 27, 1957, Ser. No. 680,602

8 Claims. (Cl. 15—21)

This invention relates to vehicle washing devices and, more specifically, to devices which are particularly well adapted for washing wheels and tires of vehicles as the vehicles are moved through a washing unit. This application is a continuation-in-part of our co-pending application, Serial No. 592,344, now abandoned, filed June 19, 1956.

A primary object of our invention is to afford a novel washer for washing wheels of automobiles, trucks, busses, and like vehicles.

Another object of our invention is to provide a novel washer of the aforementioned type which is effective to efficiently wash the wheels and tires of such vehicles as the latter advance through a vehicle washing unit.

Another object of our invention is to enable a novel washer of the aforementioned type to be moved along with such a vehicle, and to be operated, in a novel and expeditious manner.

Another object of our invention is to enable a novel washer of the aforementioned type to wash each wheel of such a vehicle as the wheels are successively advanced through a vehicle washing unit.

Yet another object of our invention is to afford a novel washer of the aforementioned type which is effective to apply steam and water to the sides of the wheels and tires of such a vehicle, and to scrub the wheels and tires in a novel and expeditious manner.

A further object of our invention is to afford a novel washer of the aforementioned type which may be reciprocated in a novel and expeditious manner along the path of travel of such a vehicle to be washed.

Another object is to enable a novel washer of the aforementioned type to be moved along with such a vehicle through an efficient wheel and tire washing operation and to be automatically and quickly returned to starting position to repeat the operation on the next successive wheel to be washed.

Another object of our invention is to enable a novel wheel washer to be pneumatically and electrically controlled in a novel and expeditious manner.

Another object of our invention is to afford a novel washer of the aforementioned type which may be readily constructed commercially and is practical and efficient in operation.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a top plan view of a wheel washer embodying the principles of our inventon;

Fig. 2 is an end elevational view of the wheel washer shown in Fig. 1;

Fig. 3 is a side elevational view of the wheel washer shown in Fig. 1;

Fig. 4 is a top plan view of one of the carriages of the wheel washer unit shown in Fig. 1, with the top cover thereof removed;

Fig. 4A is a detail sectional view taken substantially along the line 4A—4A in Fig. 4;

Fig. 5 is a detail sectional view taken substantially along the line 5—5 in Fig. 4;

Fig. 6 is a detail sectional view taken substantially along the line 6—6 in Fig. 1;

Fig. 7 is a detail sectional view taken substantially along the line 7—7 in Fig. 6;

Fig. 8 is a detail sectional view taken substantially along the line 8—8 in Fig. 1;

Fig. 9 is a top plan view of the portion of the device shown in Fig. 8;

Fig. 10 is a detail sectional view taken substantially along the line 10—10 in Fig. 4;

Fig. 11 is a diagrammatic showing of the pneumatic control system embodied in the device shown in Fig. 1;

Fig. 12 is a diagrammatic showing of the electrical control system of the device shown in Fig. 1;

Fig. 13 is a plan view, similar to Fig. 4, of another embodiment of the invention;

Fig. 14 is a simplified sectional view taken along line 14—14 in Fig. 13; and

Fig. 15 is a schematic diagram, similar to Fig. 11, of a pneumatic control system for the embodiment of Fig. 13.

In the drawings, a wheel washing device 20, embodying the principles of our invention, is shown in varying detail in Figs. 1–12 to illustrate one embodiment of our invention.

The wheel washer 20 embodies in general, two carriages 22 and 23 mounted in parallel, horizontally spaced relation to each other on two tracks 24 and 25, respectively. The tracks 24 and 25 each embody two parallel rails 24a and 24b, and 25a and 25b, respectively, and each of the carriages has a pair of front wheels 27 and a pair of rear wheels 28 mounted thereon for movement along the rails of the tracks 24 and 25, respectively, Fig. 1.

In a normal wheel washing operation of our novel washer 20, an automobile, or like vehicle to be washed, is moved forwardly from left to right, as viewed in Fig. 1, between the tracks 24 and 25. As the front wheels of the vehicle advance between the tracks 24 and 25, the carriages 22 and 23 are advanced therewith, and that wheel which is adjacent to the respective one of the carriages is sprayed with steam and water from nozzles carried by that carriage, and is also scrubbed by a brush carried by that carriage. When the carriages 22 and 23 reach the front end of the tracks 24 and 25, they are automatically returned to the rear end thereof in position to again be advanced with the rear wheels of the vehicle through another washing cycle of operation. The construction and operation of our novel invention will now be discussed in greater detail.

The carriages 22 and 23 embody the same construction, being merely reverse or mirror images of each other, and parts in each carriage which are the same as parts in the other carriage are hereinafter indicated by the same reference numbers.

Each of the carriages 22 and 23 embodies three manually operable valves 31, 32, and 33 and an electrical junction box 34 mounted on the outer upper edge portion of the housing 26 of the respective carriage 22 or 23, Figs. 1 and 3. The valves 31, 32 and 33, respectively, on the two carriages 22 and 23 are connected to each other by substantially inverted U-shaped water conduits 31a, steam conduits 32a, and air conduits 33a, respectively, and the electrical junction boxes 34 on the two carriages 22 and 23 are connected together by a substantially inverted U-shaped electrical conduit 34a, Figs. 1 and 3. The conduits 31a—34a may be grouped relatively closely together to form an arch-way through which the vehicle to be washed may pass, Figs. 1 and 2.

The conduits 31a—31a may be of any suitable construction such as, for example, suitable pipes, and may be connected to a suitable source of water, steam, and air, respectively by flexible hoses 31c, 32c, and 33c connected thereto by T-fittings 31d, 32d and 33d, respectively, Fig. 1.

A T-fitting 34d is likewise embodied in the conduit 34a above and forward of the carriage 22, Fig. 1, and a conduit 35a extends therefrom into a fuse box 35 disposed in depending relation thereto, Fig. 2.

Each of the carriages 22 and 23 also embodies an arm 36 which is normally disposed in position to project inwardly toward the other of the carriages 22 and 23 as shown in solid lines in Fig. 1. The tracks 24 and 25 are so disposed relative to each other, and the arms 36 on the carriages 22 and 23 are of such length that when a vehicle such as the vehicle V, Fig. 2, is moved forwardly between the tracks 24 and 25, from left to right as viewed in Fig. 1, the front wheels F of the vehicle first engage the arms 36 and push the carriages 22 and 23 from their normal at rest position at the rear ends 38 of the tracks 24 and 25 toward the front ends 39 thereof. When the carriages reach the front ends 39 of the tracks 24 and 25 the arms 36 are folded inwardly, in a forward direction, into a position substantially parallel to the tracks 24 and 25 past the front wheels F into normal at rest position at the rear ends 38 of the tracks 24 and 25 as will be discussed in greater detail presently.

Each of the carriages 22 and 23 has a water nozzle 31b, two steam nozzles 32b and 32s, and a brush 41 projecting inwardly from the housing 26 thereof toward the other one of the carriages 22 or 23, Fig. 1. As the carriages 22 and 23 are moved forwardly along the tracks 24 and 25 by wheels, such as the wheels F, of a vehicle, water is fed from the conduit 31a through nozzles 31b on the carriages 22 and 23 directly against the side of the wheel pushing on the arm 36 of a respective one of the carriages 22 and 23. At the same time, steam is fed from the conduit 32a through nozzles 32b and 32s on the carriages 22 and 23 directly against the aforementioned wheels of the vehicle, and the brushes 41 on the carriages 22 and 23 are pressed against the side walls of the tires of the aforementioned wheels and are rotated thereagainst to thereby scour and clean the side walls. The control of the flow of steam and water, and the control of the application of the brushes 41 against the wheels of the vehicle to be washed are effected by mechanism embodied in our novel wheel washer 20 which will now be discussed in greater detail.

It will be remembered that the carriages 22 and 23 are mirror images of each other, as are the tracks 24 and 25, and hence it will only be necessary to discuss, in detail, the construction and operation of one of the carriages 22 and 23, and one of the tracks 24 and 25.

The arm 36 on the carriage 22 embodies an elongated roller 36a rotatably mounted on one end portion of a shaft 36b, Figs. 4 and 10, the other end portion of which is pivotally mounted by a yoke 36c and a pin 36d on the outer end portion of a supporting bracket 36e which is mounted in and projects outwardly from the housing 26 of the carriage 22. An arm 43 is attached to and projects forwardly from the yoke 36c, and is pivotally connected at its front end portion to the piston 45a of an air cylinder 45 mounted within the housing 22a. The opposite end portions of the air cylinder 45 are connected by suitable air lines 47 and 48 to a control valve 49, Figs. 4 and 11.

When the manually operable valve 33 is open, air is fed at all times to the control valve 49 from the air conduit 33a through the valve 33, a conduit 51, an air filter 52, a conduit 53, a high pressure air regulator 54, a conduit 55, an air line oiler 56, a conduit 57, one leg of a T-fitting 58, and a conduit 59. Each of the control valves 49 embodies a downwardly projecting plunger 49a, Figs. 6 and 7, on the lower end portion of which is pivotally mounted a rearwardly extending arm 49b. The arm 49b is pivotally mounted at its longitudinal center on a bracket 49c which is attached to and projects downwardly from the housing of the valve 49, and a roller 49d is rotatably mounted on the rear end portion of the arm 49b. When the plunger 49a is disposed in lowermost position in the valve 49, as shown in solid lines in Fig. 6, air is fed from the conduit 59, attached to the inlet of the valve 49, through the valve 49 and the line 47 into the rear end portion of the air cylinder 45 to thereby move the plunger 45a into full outwardly projecting position and pivot the arm 36 into normal outwardly projecting position, shown in solid lines in Fig. 1. When the plunger 49a of the valve 49 is retracted into the housing thereof into uppermost position as shown in broken lines in Fig. 6, air is fed from the line 59 through the valve 49, and the line 48, into the front end portion of the air cylinder 45 to thereby retract the plunger 45a and swing the arm 36 into forwardly folded position, wherein it is disposed in substantially parallel relation to the track 24, as shown in broken lines in Fig. 1.

As a vehicle is being moved through our novel wheel washing device 20, the wheels of the vehicle engage the outwardly projecting arms 36 on the carriages 22 and move the carriages forwardly along the tracks 24 and 25. During this movement of the carriages 22 and 23 the plungers 49a of the valves 49 are disposed in lowermost position so that the roller 49d of each valve 49 is disposed in a position wherein it rides over the upper edge of a cam rail 61 mounted on the rail 24a and 25a of the tracks 24 and 25, respectively, Figs. 1 and 6. As the carriages 22 and 23 continue to advance, the rollers 49d engage the rear end portion of cam rails 63 mounted on the rails 24a and 25a between the cam rails 61 and the front end 39 of the track 24, Figs. 1 and 6. As each roller 49d advances along the cam rail 63 it is forced downwardly thereby into the position shown in broken lines in Fig. 6 to thereby push the plungers 49a upwardly into uppermost position and actuate the valves 49 so that air is then fed through the lines 48 into the front end portion of the cylinders 45 to retract the plungers 45a and fold the rollers 36 forwardly into substantially parallel relation to the track 24, as shown in broken lines in Fig. 1. With the rollers 36 disposed in this position, the carriages 22 and 23 may be moved rearwardly along the tracks 24 and 25 toward its normal at rest position at the front end 38 of the tracks 24 and 25 by mechanism which will be discussed in greater detail presently.

The mounting bracket 36e is pivotally mounted by a pin 65, Fig. 4 for pivotal movement in a horizontal direction in the housing 26 between the position shown in solid lines in Fig. 4 and the position shown in broken lines therein. A control valve 67 having a plunger 67a projecting rearwardly therefrom is mounted in the front inner corner of the housing 22a forwardly of the bracket 36e in position wherein the rear end portion of the plunger 67a is disposed in abutting engagement with the front side of the bracket 36e. When the arm 36 is disposed in normal outwardly projecting position, without the wheel of a vehicle pressing forwardly thereagainst, the arm 36 and the bracket 36e are disposed in the position shown in solid lines in Fig. 4, wherein the plunger 67 is disposed in rearwardmost projecting position. When a vehicle such as the vehicle V, Fig. 2, moves into engagement with the roller 36 and presses forwardly thereon to thereby move the carriage 22 forwardly along the track 24, the forward pressure of the vehicle on the arm 36 is effective to pivot the arm 36 and the bracket 36e, as a unit, around the pin 65 into a position wherein the arm 36 and the inner end portion of the bracket 36e are disposed in slightly forwardly projecting position as shown in broken lines in Fig. 4. When the bracket 36e is disposed in this latter position it is effective to press the plunger 67a into innermost position in the valve 67 as shown in broken lines in Fig. 4. As will be discussed in greater detail presently, the valve 67 is effective to control other mechanism in the carriage 22, including the positioning of the brush 41, the flow of steam and water through the nozzles 32b—32s, and 31b, and the mechanism for returning the carriage 22 to starting position.

It will be remembered that the air conduit 33a is connected through the valve 33, filter 52, regulator 54, and oiler 56, and conduit lines 51, 53, 55 and 57, to a T-fitting 58, one leg of which is connected by the conduit 59 to the control valve 49, which controls the outwardly projecting positioning of the arm 36, as previously discussed. The other leg of the T-fitting 58 is connected by a conduit 71 to one side of a control valve 72, Figs. 4 and 11, the other side of which is connected by a conduit 73 to the inlet 67b of the valve 67.

The valve 67 has two outlets 67c and 67d, Fig. 11. The outlet 67c is connected by a conduit 75 to one leg of a T-fitting 77. Another leg of the T-fitting 77 is connected by a conduit 78 to the inlet side of a low pressure regulator 79. The outlet side of the pressure regulator 79 is connected by a conduit 81 to one leg of a T-fitting 82. Another leg of the T-fitting 82 is connected by a conduit 83 to the inlet side of an electrically controlled solenoid valve 84, which is normally closed and is open only when the solenoid thereof is energized. The outlet side of the valve 84 is connected by a conduit 85, a T-fitting 86, a conduit 87, a T-fitting 88 and a conduit 89 to a low pressure air pressure gauge 91, which affords means for checking the pressure in this portion of the air line so that it may be kept within the proper limits by adjustment of the pressure regulator 79.

A water valve 31c, Figs. 4 and 11, is connected at its inlet side to the water valve 31 by a conduit 134, and at its outlet side by a conduit 136 to the water nozzle 31b. The valve 31c is of the normally closed type which may be opened by air pressure and, for this purpose, is connected by a conduit 93, having an air-flow control valve 94 therein, to the T-fitting 88, Fig. 11.

A steam valve 32c, Figs. 4 and 11 is connected at its inlet side to the steam valve 32 by a conduit 138, and at its outlet side by a pipe 137, and a flexible hose 139 to two pipes 125 and 126, on the ends of which are mounted the steam nozzles 32b and 32s. The steam valve 32c, like the water valve 31c, is of the normally closed type which may be opened by air pressure, and for control purposes, is connected by a conduit 92 to the T-fitting 86, Fig. 11.

A third leg of the T-fitting 82, which, it will be remembered, is connected in the air line between the pressure regulator 79 and the solenoid valve 84, is connected by a conduit 96 to one leg of a T-fitting 97, Fig. 11. Another leg of the T-fitting 97 is connected to the front end portion of an air cylinder 99. The third leg of the T-fitting 97 is connected by a conduit 101 having a check valve 102 therein, to the third leg of the T-fitting 77, which, it will be remembered, is connected in the air line between the pressure regulator 79 and the outlet 67c of the valve 67. The check valve 102 is of the type permitting the flow of air from the T-fitting 97 toward the T-fitting 77 but preventing reverse flow of air therethrough. Hence, it will be seen that the conduit 101 affords, in effect, a pressure release system for the circulation of air from the conduit 96 back into the conduit 75 and 78, when the pressure in the conduits 96 or 98 is above that in the conduits 75 and 78.

The air cylinder 99 is mounted in the housing 26 with the piston 99a thereof projecting outwardly away from the other carriage 22 or 23, Fig. 4. The free end portion of the piston 99a is pivotally connected by a pin 104 to the central portion of an elongated lever 106 which is pivotally mounted at one end by a pin 107 on a supporting bracket 108 in the housing 26. The other end portion of the lever 106 is pivotally connected by a pin 109 to one end of an elongated slide or carriage 110 which is slidably mounted for horizontal longitudinal reciprocation relative to the housing 26 between two pairs of grooved rollers 112 and 113, Figs. 4 and 5.

An electric motor 115 is fixedly mounted on the carriage 110 for reciprocation therewith, and the drive shaft 115a thereof is connected by a chain 117 to a gear 118 mounted on, and secured to, one end portion of an elongated shaft 119, Figs. 4 and 5. The shaft 119 is suitably journalled in supporting brackets 121 mounted on the slide 110, and the brush 41 is secured to the other end of the shaft 119 for rotation therewith. The brush 41 is preferably of the type having a substantially disk-shaped back 41a with bristles 41b made of suitable material such as, for example, steel wire, nylon, or the like, projecting from one face thereof in a substantially annular shaped row at the outer peripheral edge portion of that face. The other face of the back 41a is secured to a mounting disk 123 mounted on the end portion of the shaft 119 projecting from the housing 26.

As best seen in Figs. 4 and 5, the pipes 125 and 126, to which the steam nozzles 32b and 32s are connected, are also mounted on the slide 110 and extend longitudinally thereof, on opposite sides of the shaft 119, below the motor 115. The pipes are secured in the mounting brackets 121, and, therefore, are movable longitudinally with the slide 110.

When air is fed under pressure from the outlet 67c to the control valve 67 through the conduit 75, the T-fitting 77, the conduit 78, the pressure regulator 79, the conduit 81, the T-fitting 82, the conduit 96, the T-fitting 97, and the conduit 98, into the front end portion of the air cylinder 99, this is effective to move the piston 99a inwardly into the cylinder 99 to thereby pivot the lever 106 around the pin 107 in a counterclockwise direction as viewed in Fig. 4 and thereby move the slide 110 inwardly toward the other carriage 22 or 23, or to the right as viewed in Fig. 4. This movement of the slide 110 is effective to move the motor 115 and the shaft 119 inwardly, to thereby dispose the brush 41 in position to engage the bristles 41b thereof with the side walls of the tire, and the adjacent portion of the rim, of the wheel which is disposed in pushing relation to the arm 36 on the respective carriage 22 or 23. The steam nozzles 32b and 32s, on each side of the brush 41, are likewise advanced with the slide 110 toward the wheel to be washed. The ends of the nozzles 32b and 32s do not project from the housing 26 as far as the brush 41, but are so disposed that, when they are in fully projecting position, they are closely adjacent, but in spacted relation to the side of the wheel and tire to be washed.

A switch 131, having a downwardly projecting control lever 131a, Figs. 4 and 4A, is mounted on the side of the motor 115 for controlling the operation of the latter. The operation of the switch 131 is such that when the control lever 131a is disposed in forwardly extending position as shown in solid lines in Fig. 4A, the switch 131 is in "off" position and the motor 115 is, therefore, not energized. When the lever 131a is disposed in full downwardly projecting position such as shown in broken lines in Fig. 4A, the switch is "closed" and the motor 115 is energized.

A bracket 132 is mounted in the housing 26 in position to underlie the lever 131a and hold the same in closed position when the motor 115 and the slide 110 are disposed in fully retracted position as shown in Fig. 4. When the slide 110 is moved outwardly by the air cylinder 99, as previously described, the arm 131a of the switch 131 rides off from the bracket 132 and is thus permitted to drop downwardly into switch-closing position to thereby energize the motor 115. Thus it will be seen that when the slide 110 is moved outwardly into forward position to engage the brush 41 with the side of a wheel of a vehicle to be washed, the motor 115 is energized and is thereby effective to rotate the brush 41.

As best seen in Fig. 12, each of the motors 115 on the carriages 22 and 23 is connected by conductors 201, 202 and 203, and conductors 205, 206 and 207 to suitable power lines such as the lines indicated at 209, 210, and 211. Each starter unit S embodies three pairs of normally open contacts 214, 215 and 216, and the operating coil 218 of a conventional electro-magnetic relay which, when energized, is effective to close the contacts 214–216. One side of the contacts 214–216 is connected to the conductors 201–203 by suitably fused conductors 211, 222, and 223, respectively, and the other side of the pairs of contacts 214–216 are connected by suitable conductors 225, 226 and 227 to the conductors 205–207, respectively. A normally closed, manually operable master control switch M may be connected in the conductors 225–227 to afford means for completely disconnecting the starter S and the motor 115 from the power lines 209–211, if so desired.

One side of the coil 218 is connected to the power line 210 by a conductor 229 connected to the conductor 226. The other side of the coil 218 is connected by a conductor 231 to one contact 233 of the switch 131 on the motor 115, Fig. 12. The other contact 234 of the switch 131 may be connected to either one of the other power lines 209 or 211. It will be remembered that when the motor 115 is disposed in retracted position in the housing 26, the switch 131 is held open by the bracket 132. When the switch 131 is in this position, the contacts 233 and 234 are open so that the circuit to the coil 218 of the starter S is not energized and, therefore, the pairs of contacts 214–216 are in open position so that the motor 115 is not energized. When the switch 131 is closed, and the contact 234 is connected to either one of the power lines 209 or 211, this is effective to energize the coil size 218, to thereby close the pairs of contacts 214–216 and energize the motor 115.

Normally, when our novel wheel washer 20 is in operation it will be used with a vehicle washing unit wherein the vehicle to be washed is pulled therethrough by a suitable electric motor such as the motor 240, Fig. 12. The operation of which may be manually controlled by a suitable switch such as a stop-start push button switch SW, Fig. 12. The switch SW has two pairs of contacts 242 and 243, and 244 and 245. Two spring urged contact plates 247 and 248 are mounted in the switch SW, the contact plate 247 being manually movable into engagement with the contacts 242 and 243 but being normally disposed in open position relative thereto, and the contact plate 248 being normally disposed in closed position relative to the contacts 244 and 245 but being manually movable into open position relative thereto.

The motor 240 is connected by three conductors 251, 252, and 253, a starter $S_1$, and three conductors 255, 256 and 257 to the power lines 209–211, respectively. The starter $S_1$ embodies four pairs of normally open contacts 259, 260, 261, and 262, and an operating coil 264 which, when energized, is operable to close the pairs of contacts 259–262. One side of the contacts 260–262 is connected to the conductors 251–253, respectively, and thus to the motor 240. The other side of the contacts 260–262 are connected by the conductors 255–257, respectively, to the power lines 209–211.

One side of the coil 264 of the starter $S_1$ is connected to the power line 210 by a conductor 266 connected to the conductor 256. The other side of the coil 264 is connected by a conductor 268 to the contact 242 of the switch SW. The conductor 268 is also connected by a conductor 269 to one side of the normally open contact 259 of the starter $S_1$. The other side of the contact 259 is connected by a conductor 271 to the contact 243 of the switch SW. The conductor 271 is also connected to the contact 245 of the switch SW by a conductor 272. The contact 244 of the switch SW is connected to the power line 209 by a conductor 274 which is connected to the conductor 255.

It will be seen that with the contacts 259–262 of the starter $S_1$ in open position, and with the contacts 247 and 248 of the switch SW disposed in normal position, as shown in Fig. 12, the motor 240 is not energized. However, when it is desired to start the motor 240, the contact 247 may be manually depressed into engagement with the contacts 242 and 243 and the switch SW. When this occurs current will flow from the power line 209 through the conductor 255, the conductor 274, the contacts 244, 248 and 245 of the switch SW, the conductor 272, the conductor 271, the contacts 243, 247, and 242 of the switch SW, and the conductor 268 to one side of the coil 264, and then through the coil 264, the conductor 266, and the conductor 256, to the power line 210. This, it will be seen, is effective to energize the coil 264 and thereby close the pairs of contacts 259–262. The contact 274 may then be released by the operator and permitted to move into open position relative to the contacts 242 and 243. This movement of the contact 247 is ineffective to open the circuit to the motor 240 because upon energization of the coil 264 a holding circuit therefor has been effected through the pair of contacts 259. This holding circuit, extends from the power line 209 through the conductor 255, the conductor 274, the contacts 244, 248 and 245 of the switch SW, the conductor 272, the pair of contacts 259, the conductor 269, the conductor 268, the coil 264, the conductor 266, and the conductor 256 to the power line 210. When it is desired to stop the motor 240, this may be readily accomplished by momentarily manually moving the contact 248 out of engagement with the contacts 244 and 245 of the switch SW to thereby break this holding circuit. When this occurs, the starter coil 264 becomes de-energized and, therefore, permits the pairs of contacts 259–262 to open so that the circuit to the motor 240 through the contacts 260–262 is broken.

The contact 234 of the switch 131 on each of the wheel washer motors 115 is connected to the starter $S_1$ of the motor 240 in such a manner as to insure that if the motor 240 is de-energized so that the automobile being pulled thereby should stop its forward movement, the motors 115 are likewise de-energized so that the brushes 41 do not continue to scrub a stationary portion of a wheel on the vehicle, in the event that such stopping of the motor 240 occurs while a wheel was being so scrubbed. As illustrated in Fig. 12, we prefer to accomplish this by connecting the contact 234 of each of the motors 115 by a conductor 276 to a conductor 278 connected to the conductor 268 extending between the coil 264 of the starter $S_1$ and the contact 242 of the switch SW. With this connection it will be seen that when the coil 264 of the starter $S_1$ for the conveyor motor 240 is connected to the power line 209 by either the starting circuit or the holding circuit, the contact 234 of the switch 131 is likewise so connected to the power line 209. However, when the coil 264 of the starter $S_1$ is disconnected from the power line 209, the contact 234 of the switch 131 is likewise disconnected from that line. Hence, it will be seen that only when the conveyor motor 240 is operating and, therefore, is effective to advance a vehicle through the wheel washer 20, can the motors 115 be energized, so there is no danger that the motors 115 will continue to operate after the conveyor motor 240 has stopped and thereby cause the brushes 41 to scour, and possibly damage, a stationary part of a wheel or tire passing through our wheel washer 20.

Also, as shown in Fig. 12, the operating coil of the solenoid valve 84 in each of the carriages 22 and 23 is connected across two of the power supply lines 201 and 202 of the motor 115 in that carriage 22 or 23 by conductors 281 and 282, respectively. Hence it will be seen that the coil of the solenoid valve 84 in each carriage 22 and 23 is energized only when the motor 115 in that carriage is energized so that the water valve 31c and the steam valve 32c in the carriage is open only when the motor 115 is operating. Hence, if the motors 115 in either of the carriages 22 and 23 are stopped during a wheel washing operation because of the stopping of the conveyor motor 240, it will be seen that the solenoid valves 84 are thereby closed to shut off the flow of air under pressure to the valves 31c and 32c, and thereby permit the valves 31c and 32c to close so that the flow of water and steam from the nozzles 31b, and 32b and 32s, respectively, is stopped.

We have seen that when the vehicle is pushing forwardly on the arms 36 on the carriages 22 and 23, the plunger 67a of each of the valves 67 is held in full forward position by the adjacent bracket 36e. This position of the plungers 67a is effective to cause air to be fed from the outlets 67c of the valves 67 to the cylinders 99 to thereby move the brushes 41 and nozzles 32b and 32s out into washing position; and, when the motors 115 are energized, to feed air through the solenoid valves 84 to thereby open the water valves 31c and steam valves 32c and cause water and steam to be ejected directly against the wheels to be washed.

It will be remembered that, when the carriages 22 and 23 approach the front end of the tracks 24 and 25, the valves 49 are actuated by the cam tracks 63 to thereby cause the arms 36 to swing forwardly into substantially parallel relation to the tracks 24 and 25, as shown in broken lines in Fig. 1. When this occurs, the arms 36 are released from the pressure of the wheels of the vehicles, and the springs 67c on the valves 67 again move the plungers 67a into full outwardly projecting position so as to close the outlets 67c and open the outlets 67d.

When the plunger 67a of the control valve 67 in either carriage 22 or 23 is disposed in such position as to close the outlet 67c and open the outlet 67d, it will be seen that air under pressure is fed from the outlet 67d through a conduit 144, one leg of a T-fitting 145, a conduit 146, having an air flow control valve 147 therein, to the rear end portion of the air cylinder 99 to thereby cause the piston 99a thereof to be moved into outwardly projecting position relative to the air cylinder 99. This outward movement of the piston 99a is effective to pivot the lever 106 in a clockwise direction around the pin 107, as viewed in Fig. 4, to thereby move the slide 110 outwardly away from the other carriage 22 or 23, or to the left as viewed in Fig. 4, and thereby move the slide 110 and the motor 115 back into normal, at rest position as shown in solid lines in Fig. 4. This movement of the slide 110 and the motor 115 is effective to retract the brush 41 from its engagement with the wheel being washed, and it will be remembered, this outward movement of the motor 115 is effective to engage the lever 131a on the switch 131 with the plate 132 to thereby de-energize the motor 115.

Suitable bleeds, not shown, are embodied in the air line on the opposite side of the pressure regulator 79 from the valve 67, as, for example, in the air cylinder 99, the water control valve 31c and the steam control valve 32c, so that when the air pressure to these units is cut off either by the valve 67 or the valve 84, the air on the low pressure side of the regulator 79 is permitted to escape to the atmosphere.

One of the other legs of the T-fitting 145, which is connected by the conduit 144 to the outlet 67d of the valve 67, is connected by a conduit 149 to one side of a reversible air motor 151. The other side of the air motor 151 is connected by a conduit 152 to a valve 153 mounted in the housing 22a adjacent to the previously mentioned valve 72. The other side of the valve 153 is vented to the atmosphere so that when the valve 153 is open, the line 152 from the air motor 151 is vented to the atmosphere, and when the valve 153 is closed, it is effective to stop the flow of air from the valve 67 through the conduit 144, the air motor 151, and the conduit 152, and thereby stop the motor 151.

As is best seen in Figs. 1, 4 and 5, each of the air motors 151 has a drive shaft 151a, which is rotatable thereby, and a sprocket 151b is secured to the drive shaft 151a. Each sprocket 151b is drivingly connected by a chain 161 to a sprocket 163 secured to a shaft 164 journalled in the housing 26. Another sprocket 165 is mounted on the shaft 164, for rotation therewith, and is disposed between and in radial alignment with two sprockets 167 and 168 mounted on shafts 169 and 170, respectively, journalled in the housing 26.

Two sprocket chains 172 are mounted in the tracks 24 and 25, respectively, and extend between the front ends 39 and the rear ends 38 thereof along the paths of travel of the sprockets 165, 167 and 168 in the carriages 22 and 23 along the tracks 24 and 25. Each of the chains 172 is trained over the gear 165 and under the gears 167 and 168 in the respective carriages 22 and 23.

When either motor 151 is being driven by air flowing from the valve 67 toward the valve 153, the drive shaft 151a is rotated thereby in a clockwise direction, as viewed in Fig. 4, so that the sprocket 165 is likewise driven in a clockwise direction and the carriage 22 or 23 is moved rearwardly thereby along the respective chain 172.

Each of the valves 153 connected to the air motors 151 embodies a spring urged plunger 153a which projects downwardly therefrom and which, when disposed in full downwardly projecting position is effective to open the valve 153, and when disposed in raised position is effective to close the valve 153. The plunger 153a is spring urged toward valve opening position. The valve 72 is of the same construction as the valve 153.

At the rear end portions of the tracks 24 and 25 cam plates 155 are mounted in the outer corners thereof, Figs 1, 8 and 9. The cam plates 155 embody a horizontally disposed top wall 155a supported on vertically disposed flanges 155b, Figs. 8 and 9. Two forwardly and downwardly sloping ears 155c and 155d project forwardly from the top wall 155a of each of the cam plates 155, the leading edge of the ear 155d projecting forwardly ahead of the leading edge of the ear 155c. The cam plates 155 are disposed in the path of travel of the downwardly depending plungers on the valves 72 and 153, with the ears 155c disposed in the path of travel of the plungers on the valves 72, and the ears 155d disposed in the path of travel on the plungers on the valve 153.

Hence it will be seen that as the carriages 22 and 23 are moved forwardly by a vehicle to be washed, the plungers on the valves 72 and 73 move forwardly off from the cam plates 155 to thereby open the valves 72 and 153. During return movement of the carriages 22 and 23, the plunger on the valves 72 and 73 ride forwardly along the ears 155c and 155d, respectively, back on to the top wall 155a of the cam plates 155 to thereby close the valves 72 and 153. Inasmuch as the ear 155d is disposed forwardly of the ear 155c, the valves 153 are closed prior to the valves 72 for a purpose which will be discussed in greater detail presently.

In a typical operation of our novel wheel washing device, the valves 31, 32 and 33 on both of the carriages 22 and 23 are manually opened. The carriages 22 and 23 are normally disposed in full rearward position on the tracks 24 and 25, as shown in solid lines in Fig. 1. It will be remembered that when the carriages 22 and 23 are disposed in this position, and no vehicle is pressing against the arms 36, the arms 36 project substantially perpendicularly outwardly from the carriages 22 and 23 as shown in solid lines in Fig. 1. The plunger 49a of the valve 49, Figs. 6 and 11, is in fully raised position so that air is fed from the line 33a through the valve 49 and the conduit 47 to the rear end of the air cylinder 45, to thereby hold the arm 36 in the aforementioned outwardly projecting position.

At this same time, air under pressure is fed from the line 33a to the inlet of the valve 72. Inasmuch as the plunger of the valve 72 is held in raised position by the cam plate 155, this valve is closed to thereby prevent the flow of air through the conduit 73 to the valve 67.

When a vehicle moves through the washing unit in the normal forward direction, which is from left to right as viewed in Fig. 1, the front wheels thereof engage the arms 36 and move the carriages 22 and 23 forwardly along the tracks 24 and 25. The pressure of the wheels of the vehicle forwardly on the arms 36 cause the arms 36 to pivot forwardly with the brackets 36e around the pivot pin 65 into a forwardly disposed position as shown in broken lines in Fig. 4. This movement of the arms 36 and the brackets 36e is effective to press the plunger 67a inwardly into fully depressed position. When the plunger 67a is disposed in this position, the outlet 67d of the valve 67 is closed and the outlet 67c is open. As the carriages 22 and 23 move forwardly on the tracks 24 and 25, the plungers on the valves 72 and 153 ride off from the cam plates 155. Hence, both valves 72 and 153 in each of the carriages 22 and 23 are permitted to open. The opening of valve 72 permits air, under pressure, to flow from the valve 72 to the inlet 67b of the valve 67. From the valve 67, the air flows out through the outlet 67c, which is now open, through the conduit 75, the T-fitting 77, the conduit 78, the low pressure regulator 79, the conduit 81, to the T-fitting 82. From the T-fitting 82, air flows into the front end portion of the air cylinder 99 to thereby move the piston 99a thereof inwardly and cause the slide 110 to be moved outwardly to thereby engage the brushes 41 with the sides of the wheels to be washed. As previously explained, the movement of the motor 115 with the slide 110 opens the switch 131 thereon to thereby energize the motor 115 and cause the brush 41 to be rapidly revolved so that it effectively scrubs the side walls of the tires on the wheels to be washed. Also, the energizing of the motor 115 is effective to energize the coil of the solenoid valves 84 to thereby open the valves 84, so that, in addition to air being fed from the T-fitting 82 to the air cylinder 99, air is fed from the T-fitting 82 to the water valve 31c and the steam valve 32c to thereby cause water and steam to be discharged from the water nozzle 31b and the steam nozzles 32b and 32s, respectively.

As the vehicle continues to advance through the washing unit 20, the wheels thereof maintain the forward pressure on the arms 36 to thereby keep the plunger 67a of the valve 67 depressed so that the brush 41 is rotated by the motor 115, water flows from the nozzle 31b, and steam is discharged from the nozzles 32b and 33b.

As the carriages 22 and 23 approach the forward end portions of the tracks 24 and 25, the rollers 49d on the valves 49 engage the cam tracks 63 and are thereby pulled downwardly to thereby press the plunger 49a upwardly into full upward position in the valves 49. This movement of the plunger 49a shifts the valve 49 so as to close the conduit 47 and open the conduit 48 to thereby feed air into the front end portion of the cylinder 45 and cause the arms 36 to be pivoted forwardly around the pivot pins 36d into a forwardly projecting position, as shown in broken lines in Fig. 1. This forward movement of the arms 36 releases the pressure on the plungers 67a of the valve 67 so that the plungers 67a are moved outwardly by the springs 67e into full outwardly projecting position to thereby close the outlet 67c of the valve 67 and open the outlet 67d. Closure of the outlet 67c cuts off the supply of air pressure to the air controlled valves 31c and 32c so that these valves are permitted to close and thereby cut off the flow of water and steam through the nozzle 31b, and the nozzles 32b and 33b, respectively.

The closure of the outlet 67c of the valve 67 is also effective to cut off the air pressure to the front end portion of the air cylinder 99 and, inasmuch as the outlet 67d of the valve 67 is now open, the air under pressure flows from the outlet 67d into the rear end portion of the air cylinder 99 to thereby cause the arm 67a to be moved outwardly from the air cylinder 99. This movement of the piston 99a causes the slide 110 to be moved back into normally retracted position as shown in solid lines in Fig. 4, and when the arm 131a rides on to the bracket 132, the switch 131 is closed to thereby de-energize the motor 115 and stop the rotation of the brush 41. While the slide 110 is being retracted by the air pressure fed from the outlet 67d of the valve 67, air is also fed from the outlet 67d of the valve 67 to the air motor 151. The valve 153, which is connected to the other side of the air motor by the conduit 152, being open, the air from the conduit 149 is permitted to flow through the air motor and thence through the conduit 152 and the valve 153 to the atmosphere. This flow of compressed air through the air motor 151 is effective to rotate the gear 151b, and move the carriage 22 or 23 rearwardly along the chain 172, as previously explained.

As the carriages 22 and 23 are thus moved rearwardly by the air motor 151, the arms 36 are moved back past the wheels of the vehicle with which they were formerly engaged. Thereafter, the rollers 49d on the valves 49 engage and ride upwardly on to the cam tracks 61, Fig. 6, to thereby pull the plunger 49a of the valve 49 outwardly into fully extended position. This movement of the plunger 49a is effective to close the outlet to the conduits 48 connected to the valve 49, Fig. 11, and open the outlet to the conduits 47 to thereby cause the plunger 45a of the air cylinder 45 to be moved outwardly and thus swing the arms 36 around the pins 36d in a clockwise direction, as viewed in Fig. 1, into fully extended position as shown in solid lines in Figs. 1 and 4.

The movement of the carriages 22 and 23 rearwardly along the tracks 24 and 25 by the air motors 151 is quite rapid. As the carriages 22 and 23 approach the rear end portions of the tracks 24 and 25, the plungers 153a of the valves 153 ride upwardly on to the cam plates 155 to thereby close the valves 153. This it will be seen is effective to stop the flow of air through the air motors 151. However, inasmuch as the air pressure in the conduit 152 must build up before it is effective to stop the air motor completely, the stopping thereof is somewhat gradual and the conduits 152 and the valves 153 act somewhat as an air brake which is effective to cushion the stop of the air motors 151 and, therefore, of the carriages 22 and 23. As the carriages 22 and 23 are coming to a stop, the plungers of the valve 72 move upwardly on to the cam plates 155 to thereby close the valves 72 and completely shut off the flow of air from the air line 33a to the air valve 67. This completes a cycle of operation of our novel car washer, and the carriages 22 and 23 are now disposed in normal at rest position, wherein they are in position to have the arms 36 thereof engaged by the next pair of vehicle wheels moving through the car washer or thereby commence another complete cycle of operation.

Figs. 13–15 illustrate a modified embodiment of the invention which affords some additional operating advantages. In many respects, the washing device illustrated in Figs. 13–15 is essentially similar to that of the previously described apparatus; accordingly, wherever possible, similar elements and members have been identified with the same reference numerals as in the construction of Figs. 1–12, despite the fact that the location of the elements within the physical structure of the washing device may have been changed.

The washing device 23 shown in Fig. 13 is essentially similar to the device 22 as illustrated in Fig. 4 and comprises a frame 26 which is supported by the wheels 27 and 28 upon suitable rails such as the rails 25 in Fig. 1.

As in the previous embodiment, the washing device 23 is provided with suitable manually operable valves 31, 32, and 33 for connection to the water, steam, and air conduits of the washing system. In addition, an electrical junction box may be provided, but is not illustrated in Fig. 13. The carriage 23 of Fig. 13 also embodies the pusher arm 36 which projects into the path of a vehicle being washed and is engaged by a wheel of the vehicle to drive the washing device along the rails during the washing operation. As in the previously described embodiment, the pusher arm 36 is preferably provided with a roller 36a to minimize friction between the pusher arm and the vehicle wheel.

As before, the end of the pusher arm shaft 36b opposite the roller 36a is pivotally mounted, as by a yoke 36c and a pin 36d, on the outer end of a support bracket 36e. An arm 43 is affixed to the yoke 36c and is connected to the piston 45a of an air cylinder 45 incorporated in the washer unit.

The washer unit 23 is provided with a water nozzle 31b which projects from the frame 26 toward the vehicle being washed and which is connected to the water inlet valve 31 through an air-operated water control valve 31c. The washing unit is also provided with two steam spray nozzles 32b and 32s which are connected to the steam line inlet valve 32 by a suitable conduit in which an air-operated steam control valve 32c is interposed. The two nozzles 32b and 32s are disposed on opposite sides of a brush 241 which is affixed to one end of a shaft 219, the other end of the shaft 219 being connected to an electrical motor 215 by means of a flexible coupling 220. As in the previously described embodiment, the steam nozzles, the brush, the motor, and the shaft interconnecting the motor and the brush are all supported upon a carriage which is guided for movement transversely of the washing unit by the grooved rollers 112 and 113. Thus, the steam nozzles 32b and 32s and the brush 241 may effectively be moved toward and away from engagement with the wheel of a vehicle being washed.

The motor 215 employed in this embodiment of the invention is somewhat different from the motor 115 of the first-described embodiment in that it comprises a self-contained gear motor, thereby eliminating the speed-reduction drive illustrated in Fig. 5. With this type of motor, a flexible coupling such as the coupling 220 is preferred, since it is desirable to avoid any undue strain upon the motor which might otherwise arise from misalignment between the motor shaft and the brush shaft 219.

There is another and highly important difference between the motor and brush mounting arrangement of this embodiment of the invention and that desired in connection with Figs. 1-12. As illustrated in Fig. 14, the brush shaft 219 and the motor 215, together with the brush 241, are inclined at an acute angle to the horizontal, so that the brush faces somewhat downwardly as well as outwardly of the washing device. Preferably, the angle of inclination of the brush driving apparatus with respect to the horizontal is approximately fifteen degrees, although this may be varied by as much as five degrees in either direction. This inclination of the brush and brush drive apparatus is highly advantageous in the cleaning of the side walls of a tire such as the tire 242 illustrated in section in Fig. 14. This apparently minor change results in a marked increase in the efficiency of the washing device and produces much more satisfactory results than can be achieved with any arrangement in which the brush face extends approximately vertically.

The pneumatic control arrangement for the washing unit of the embodiment of Figs. 13-15 is also somewhat different from that of Figs. 1-12. As indicated in Fig. 15, the air inlet conduit 33a is connected in series to the inlet valve 33, the air filter 52, the air pressure regulator 54, and the air line oiler 56 by means of the conduits 51, 53, and 54. A further conduit 57 connects the air line oiler to the T-fitting 58, which in turn is connected to the air control valves 49 and 67 by the conduits 59 and 73 respectively. In this embodiment, it will be noted that the independent shutoff valve 72 utilized in the arrangement shown in Fig. 11 is not employed.

The two outlet ports of the pusher arm control valve 49 are connected to the opposite ends of the air cylinder 45, suitable air flow controls being provided within the connecting lines 47 and 48. The air cylinder 45 controls the retraction of the pusher arm 36 at the end of the washing cycle as described above in connection with the embodiment of Figs. 1-12, the piston 45a of the air cylinder being connected to the yoke arm 43.

The first outlet port 67c of the air control valve 67 is connected by the conduit 75 through the two T-fittings 277 and 282 to a regulating valve 280. The outlet port of the regulating valve is connected through the solenoid-operated interlocking valve 84 to the two air-operated water and steam control valves 31c and 32c. The T-fitting 277 affords a means for connecting the air conduit 75 to the ram pressure regulator valve 279, the outlet port of the regulator being connected to the brush carriage actuating air cylinder 99. As before, the inlet port on the air cylinder 99 connected to the regulator 279 is also returned to the air line 75 through the check valve 102, which connects into the T-fitting 282.

The remaining outlet port 67d of the ram air control valve 67 is connected to the T-fitting 145 which in turn is connected to an air motor 251 by means of a conduit 149 in which a check valve 252 is preferably interposed. The outlet port of the air motor 251 is connected to the brake valve 153; in this embodiment, a speed-control valve 253 is preferably interposed in the conduit 152 connecting the air motor to the brake valve. The T-fitting 145 is also connected to the air cylinder 99 as before; a rapid release valve 247 is interposed in the connecting line 146 in addition to the air flow control device 147. The operation of the pneumatic control system, as described hereinafter, may best be understood by considering the schematic diagram of Fig. 15; the physical disposition of many of the operating elements is indicated in Fig. 13.

The operation of the embodiment of Figs. 13-15 is in many respects essentially similar to that of Figs. 1-12; accordingly, only a brief review of the operational characteristics and a consideration of the differences between the two embodiments is included herein. When the washer device is placed in operation, the water, steam, and air valves 31, 32, and 33 are manually opened and the carriage is disposed in its initial or rearward position as shown in solid lines in Fig. 1. As before, the pusher arm 36 is in the position indicated in Fig. 13 and the arm is maintained in that position by air supplied to the air cylinder 45 through the pusher arm control valve 49.

When a vehicle engages the pusher arm 36, it moves the carriage of the washer device forwardly along the tracks (Fig. 1) and at the same time pivots the pusher arm 36 forwardly around the pivot pin 65, the displacement of the pusher arm being limited to a relatively small angle as described hereinabove in connection with Fig. 4. This pivotal movement of the pusher arm 36 effectively actuates the ram air control valve 67 to open the outlet port 67c and close the port 67d. Under these conditions, air is supplied under pressure to the air cylinder 99, which operated to drive the slide supporting the motor 215 toward the vehicle, bringing the brush 241 into engagement with the wheel of the vehicle. This same operation of the air cylinder 99 also actuates a motor control switch 231 which energizes the motor 215 to rotate the brush 241 and scrub the side wall of the tire 242 (Fig. 14). The switching device 231 also energizes the coil of the interlocking solenoid valve 84. Consequently, air is fed to the water and steam control valves 31c and 32c, opening those valves and discharging water and steam from the water nozzle 31b and the steam nozzles 32b and 32s respectively. Continued movement of the vehicle maintains these operating conditions for a substantial period of time sufficient to permit washing of the entire periphery of the tire 245.

When the washer carriage nears the forward end of the track, the cam-operated pusher arm control valve 49 is actuated as described hereinabove to close the conduit 47 and open the conduit 48. This reversal of the air input to the cylinder 45 causes the pusher arm 36 linked thereto to be pivoted forwardly to a position clear of the vehicle. The forward movement of the pusher arm actuates the control valve 67, closing the outlet 67c and opening the outlet 67d. This operation effectively shuts off the flow of water and steam by closing the two pilot valves 31c and 32c. Actuation of the valve 67 also cuts off air pressure to the one end of the air cylinder 99 and admits air under pressure through the lines 144 and 146 to the opposite end of the air cylinder. This reversal of the air connections to the cylinder 99 causes the slide supporting the motor 215 and the brush 241, along with the steam outlet nozzles, to be moved into the initial or retracted position illustrated in Fig. 13. When the return movement of the brush and motor is completed, the electrical control switch 231 is actuated to de-energize the motor 115 and also to close the solenoid-actuated valve 84.

Opening of the port 67d of valve 67 also causes air to be fed under pressure through the conduits 144 and 149 and the check valve 252 into the inlet port of the air motor 251. Because the brake valve 153 is open at this stage of operation, the pneumatic circuit is complete to the atmosphere and the compressed air drives the air motor, to rotating the gear train connected thereto and moving the carriage 23 to its initial position as described above, for carriage 22, in connection with Fig. 4.

As the carriage returns toward its initial position, the cam-controlled valve 49 is again actuated, closing the outlet to the conduit 48 and opening the outlet to the conduit 47. As a consequence, the air input to the pusher arm operating cylinder 45 is again reversed and the air cylinder operated to swing the arm 36 back to its fully extended position as illustrated in Fig. 13. The valve 153 serves as a brake on the rearward movement of the carriage in the manner described hereinabove.

The speed control valve 253, which is incorporated in the conduit 152 linking the air motor 251 to the brake valve 153 (Fig. 15) may be utilized to limit the amount of air flowing through the air motor and thereby prevent excessive speeds in the return movement of the washer carriage. The rapid release valve 247 incorporated in the conduit 146, on the other hand, which is provided with a vent 248, facilitates rapid bleeding of air under pressure from the cylinder 99. In this way, the release valve 247 permits relatively quick and expedient conditioning of the system for a washing operation whenever the carriage is returned to its initial or rearward position. The use of the two regulating valves 279 and 280 instead of the single regulating device 79 of the embodiment of Fig. 11 allows the use of different operating pressures for the air cylinder 99 and the pilot control valves 31c, and 32c. This arrangement is not particularly important but affords more freedom in selection of pneumatic components, since the design requirements for the air cylinder are not dictated by the pressure requirements for the pilot valves and vice versa.

It will thus be seen that the washing devices of the invention effectively and expeditiously clean each wheel of a vehicle as the vehicle advances past the washing device. Steam and water are applied to the sides of the wheels and tires of the vehicle, which are simultaneously scrubbed to remove any tenacious dirt which might otherwise adhere thereto. The washing unit quickly and automatically returns to its starting position upon the completion of each washing cycle. The washer unit is relatively economical in construction and is extremely effective in operation.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A washing device for washing the wheels of a vehicle as the vehicle moves along a predetermined path of travel comprising two elongated tracks mounted on opposite sides of said path of travel in substantially parallel relation thereto, two carriages, each of said carriages being mounted on a respective one of said tracks and reciprocable therealong between a rearward and forward position, each of said carriages normally being disposed in said rearward position, two arms, each of said arms being pivotally mounted on a respective one of said carriages for movement between an outwardly projecting position and a collapsed position, said arms, when disposed in said outwardly projecting positions, projecting into said path of travel in position to be engaged by said wheels to be washed to thereby push said carriages along said tracks from said rearward position to said forward positions, said arms, when disposed in said collapsed positions, being disposed in substantially parallel relation to said tracks and out of said path of travel, actuating means at said rearward positions on said tracks, other actuating means at said forward positions on said tracks, means mounted on said carriages for wetting and scrubbing said wheels during said movement of said carriages from said rearward position to said forward position in response to engagement of said wheels with said arms, means, including a valve mounted on said carriage and engageable by said other actuating means when said carriages are at said forward positions, for returning said carriages to said rearward positions, and means, including a valve mounted on said carriage and engageable by said first mentioned actuating means when said carriages are disposed in said rearward positions, for stopping the movement of said carriages in said rearward positions.

2. A washer device for washing the wheels of a vehicle as the vehicle moves along a predetermined path of travel comprising two elongated tracks mounted on opposite sides of said path of travel in substantially parallel relation thereto, two carriages, each of said carriages being mounted on a respective one of said tracks and reciprocable therealong between a rearward and forward position, each of said carriages normally being disposed in said rearward position, two arms, each of said arms being pivotally mounted on a respective one of said carriages for movement between an outwardly projecting position and a collapsed position, said arms, when disposed in said outwardly projecting positions, projecting into said path of travel in position to be engaged by said wheels to be washed to thereby push said carriages along said tracks from said rearward position to said forward positions, said arms, when disposed in said collapsed positions, being disposed in substantially parallel relation to said tracks and out of said path of travel, actuating means at said rearward positions on said tracks, other actuating means at said forward positions on said tracks, means for wetting and scrubbing said wheels during said movement of said carriages from said rearward position to said forward position, and valve means for controlling the operation of said last mentioned means, said valve means comprising valves connected to said arms and operable by said arms, in response to engagement of said arms by said wheels, to effect operation of said means for wetting and scrubbing said wheels, valves mounted on said carriages and engageable with said first mentioned actuating means and connected to said first mentioned valves for stopping operation of said first mentioned valves when said carriages are disposed in said rearward position, and means, including valves mounted on said carriages and engageable with said other actuating means when said carriages are in said forward position, for moving said arms away from said engagement with said wheels into said collapsed positions.

3. A washer device for washing the wheels of a vehicle as the vehicle moves along a predetermined path of travel comprising two elongated tracks mounted on opposite sides of said path of travel in substantially parallel relation thereto, two carriages, each of said carriages being mounted on a respective one of said tracks and reciprocable therealong between a rearward and forward position, each of said carriages normally being disposed in said rearward position, two arms, each of said arms being pivotally mounted on a respective one of said carriages for movement between an outwardly projecting position and a collapsed position, said arms, when disposed in said outwardly projecting positions, projecting into said path of travel in position to be engaged by said wheels to be washed to thereby push said carriages along said tracks from said rearward positions to said forward positions, said arms, when disposed in said collapsed positions, being disposed in substantially parallel relation to said tracks and out of said path of travel, actuating means at said rearward positions on said tracks, other actuating means at said forward positions on said tracks, spraying means on said carriages for spraying a washing fluid against said wheels, brushing means on said carriages for brushing said wheels, valve means on said carriage in position to be operated by said arms for controlling the operation of said spraying means and said brushing means in response to limited pivotal movement of said arms when engaged by said wheels, other valve means mounted on said carriages and engageable with said first mentioned actuating means for controlling the operation of said first mentioned valve means, and valve means mounted on said carriages and operable by said other actuating means for moving said arms into collapsed position when said carriages are disposed at said forward positions.

4. In a washer device for washing the wheels of a vehicle as the vehicle moves along a predetermined path of travel, an elongated track parallel to said path of travel, a carriage mounted on said track for reciprocation therealong between a forward position and a rearward position, means mounted on said carriage for wetting and scrubbing such a wheel during movement of said carriage from said rearward position to said forward position, an arm mounted on said carriage for pivotal movement relative thereto and normally projecting therefrom into said path of travel in position to be engaged by such a wheel moving along said path to thereby push said carriage from said rearward position to said forward position, means on said carriage and operable by said track at said forward position for swinging said arm out of said engagement with such a wheel into substantially parallel relation to said track, means connected to said first named means and operable by said arm for controlling said first named means to effect actuation of said first named means when said arm is pushingly engaged and pivoted to a limited extent by said wheel and to stop operation of said first named means when said arm is not so engaged by said wheel, and means on said carriage connected to said means operable by said track and controlled thereby to move said carriage from said forward position to said rearward position.

5. A washing device for washing the wheels of a vehicle as the vehicle traverses a predetermined path comprising a first carriage disposed adjacent said path and movable in a direction parallel thereto, a second carriage supported on said first carriage for movement between a retracted position spaced from said path and an operating position more closely adjacent said path, fluid application means mounted on said second carriage for applying fluid under pressure to a wheel of a vehicle moving along said path, scrubbing means mounted on said second carriage at an acute angle with respect to the horizontal for engaging and scrubbing the vehicle wheel when said second carriage is in its operating position, and a pneumatic control system for controlling said second carriage, said fluid application means, and said scrubbing means, said system including a control arm movably mounted on said carriage and engageable by the vehicle wheel, and control valve means connected to said second carriage, said fluid application means, and said scrubbing means and actuatable by limited movement of said control arm in response to engagement thereof by the vehicle wheel.

6. A washing device for washing the wheels of a vehicle as the vehicle traverses a predetermined path comprising a first carriage disposed adjacent said path and movable in a direction parallel thereto, a second carriage supported on said first carriage for movement between a retracted position spaced from said path and an operating position more closely adjacent said path, fluid application means for applying fluid under pressure to a wheel of a vehicle moving along said path, scrubbing means mounted on said second carriage for engaging and scrubbing the vehicle wheel, and a pneumatic control system for controlling said second carriage, said fluid application means, and said scrubbing means, said system including a control arm mounted on said carriage and engageable by the vehicle wheel and control valve means connected to said second carriage and said fluid application means and actuatable by movement of said control arm in response to pressure applied thereto by the vehicle wheel.

7. A washing device for washing the wheels of a vehicle as the vehicle traverses a predetermined path comprising: a first carriage disposed adjacent said path and movable in a direction parallel thereto, a second carriage supported on said first carriage for movement between a retracted position spaced from said path and an operating position more closely adjacent said path, fluid application means mounted on said second carriage for applying fluid under pressure to a wheel of a vehicle moving along said path, scrubbing means comprising a rotary brush and drive means therefor mounted on said second carriage at an angle of approximately 15 degrees with respect to the horizontal for engaging and scrubbing the vehicle wheel, and a control system for controlling said second carriage, said fluid application means, and said scrubbing means, said system including a control arm mounted on said carriage and engageable by the vehicle wheel, control valve means connected to said second carriage and said fluid application means and actuatable by movement of said control arm in response to the application of force to said arm by said vehicle wheel, and a control device for energizing said brush drive means in response to movement of said carriage.

8. A washing device for washing the wheels of a vehicle as the vehicle traverses a predetermined path comprising: a first carriage disposed adjacent said path and movable in a direction parallel thereto, a second carriage supported on said first carriage at an angle of approximately 15 degrees to the horizontal for movement between a retracted position spaced from said path and an operating position more closely adjacent said path, fluid application means for applying fluid under pressure to a wheel of a vehicle moving along said path, scrubbing means mounted on said second carriage for engaging and scrubbing the vehicle wheel when the second carriage is in its operating position, and a pneumatic control system for controlling said second carriage, said fluid application means, and said scrubbing means, said system including a control arm mounted on said carriage and engageable by the vehicle wheel and control valve means connected to said second carriage and said fluid application means and actuatable by movement of said control arm responsive to engagement of said control arm by a vehicle wheel.

(References on following page)

References Cited in the file of this patent

UNITED STATES PATENTS

| | | |
|---|---|---|
| 2,692,214 | Hurst | Oct. 19, 1954 |
| 2,716,767 | Davis | Sept. 6, 1955 |
| 2,716,772 | Cockrell | Sept. 6, 1955 |
| 2,718,650 | Haverberg | Sept. 27, 1955 |
| 2,761,170 | Bonneau | Sept. 4, 1956 |
| 2,814,825 | Guthrie et al. | Dec. 3, 1957 |

FOREIGN PATENTS

| | | |
|---|---|---|
| 497,422 | Canada | Nov. 3, 1953 |